(12) United States Patent
Miller et al.

(10) Patent No.: US 12,158,645 B2
(45) Date of Patent: Dec. 3, 2024

(54) SYSTEM, METHOD AND COMPUTER READABLE MEDIUM FOR CONTROLLING OBSERVED TEMPERATURE OF ONE OR MORE PANELS

(71) Applicant: POLARIS SOLUTIONS LTD., Caesarea (IL)

(72) Inventors: Asaf Miller, Kibbutz Metzer (IL); Itay Moshe, Modi'in (IL); Liron Ben-Bashat Bergman, Binyamina (IL)

(73) Assignee: POLARIS SOLUTIONS LTD., Caesarea (IL)

( * ) Notice: Subject to any disclaimer, the term of this patent is extended or adjusted under 35 U.S.C. 154(b) by 0 days.

(21) Appl. No.: 17/997,825

(22) PCT Filed: Apr. 7, 2021

(86) PCT No.: PCT/IL2021/050398
§ 371 (c)(1),
(2) Date: Nov. 3, 2022

(87) PCT Pub. No.: WO2021/229562
PCT Pub. Date: Nov. 18, 2021

(65) Prior Publication Data
US 2023/0350240 A1  Nov. 2, 2023

(30) Foreign Application Priority Data
May 11, 2020 (IL) .......................................... 274590

(51) Int. Cl.
G02F 1/133 (2006.01)
F41H 3/00 (2006.01)
(Continued)

(52) U.S. Cl.
CPC ........... *G02F 1/13306* (2013.01); *F41H 3/00* (2013.01); *G02F 1/1334* (2013.01); *G02F 1/137* (2013.01); *G02F 2203/11* (2013.01)

(58) Field of Classification Search
None
See application file for complete search history.

(56) References Cited

U.S. PATENT DOCUMENTS

2010/0000023 A1  1/2010  McAllister et al.
2010/0000231 A1  1/2010  Meir
(Continued)

OTHER PUBLICATIONS

Huang Jinhua et al.: "Simultaneous achievement of high visible transmission and near-infrared heat shielding in flexible liquid crystal-based smart windows via electrode design", Solar Energy, Elsevier, Amsterdam, NL, vol. 188, Jul. 2, 2019 (Jul. 2, 2019), pp. 857-864, XP085797374, ISSN: 0038-092X, DOI: 10.1016/J.SOLENER.2019.06.063, [retrieved on Jul. 2, 2019] * section 3; figure 6b *.
(Continued)

*Primary Examiner* — Michael H Caley
(74) *Attorney, Agent, or Firm* — S.J. Intellectual Property LTD.

(57) ABSTRACT

A Thermal Transparency Control Device (TTCD), comprising: an inner layer of Polymer Dispersed Liquid Crystal (PDLC) capable of changing an arrangement of liquid crystals comprised therein, in response to a change in a level of voltage supplied to the PDLC, so that the inner layer becomes more transparent as the voltage increases, thereby enabling more thermal radiation to pass through the inner layer; the inner layer placed between two outer layers of material wherein at least part of each of the two outer layers enables thermal radiation passage therethrough and wherein each of the two outer layers comprises an electrical interface that is in contact with the inner layer.

20 Claims, 2 Drawing Sheets

(51) Int. Cl.
    *G02F 1/1334* (2006.01)
    *G02F 1/137* (2006.01)

(56) References Cited

U.S. PATENT DOCUMENTS

| | | | |
|---|---|---|---|
| 2014/0125506 A1* | 5/2014 | Sjolund | F41H 3/00 |
| | | | 342/3 |
| 2015/0277165 A1 | 10/2015 | Burrows et al. | |
| 2018/0267382 A1* | 9/2018 | Kwon | H04N 23/11 |
| 2020/0241335 A1* | 7/2020 | Lee | G02F 1/1334 |

OTHER PUBLICATIONS

Huang et al. "Simultaneous achievement of high visible transmission and near-infrared heat shielding in flexible liquid crystal-based smart windows via electrode design" Solar Energy, vol. 188, Aug. 2019, pp. 857-864; Jul. 2, 2019; entire document, especially abstract, Fig. 1b; p. 858 [on line J <https://www.sciencedirect.com/science/article/abs/pii/S0038092X19306371>.

* cited by examiner

SYSTEM, METHOD AND COMPUTER READABLE MEDIUM FOR CONTROLLING OBSERVED TEMPERATURE OF ONE OR MORE PANELS

TECHNICAL FIELD

The invention relates to a system, method and computer readable medium for controlling observed temperature of one or more panels.

BACKGROUND

Active camouflage or adaptive camouflage is a form of technological camouflage developed to conceal an object from visual detection by rapidly adapting to its surroundings. It plays an important role in battlefield platforms, military targets, personnel, strategic installations, etc. as it can "cloak" an object and make it effectively invisible from view. For example, it can be very challenging to detect a military object with active camouflage system by an infrared seeking missile.

Various techniques and materials attempt to achieve active camouflage. For example, some technologies utilize light-emitting diodes (LEDs) or organic light-emitting diodes (OLEDs) mounted on panels and linked to cameras to project images onto irregularly shaped surfaces (such as soldiers, military vehicles, etc.), covered by these panels, that may be in a stationary or moving position. Typically, this technology is applicable for visible wavelengths of EM spectrum. Other technologies known in the art attempt to achieve active camouflage in the infrared spectrum (e.g. by changing an infrared signature of the concealed object), which is mostly invisible to the human eye. These technologies utilize Peltier panels that enable temperature modulation of the panels (can be rapidly heated and cooled) and infrared cameras which continuously gather thermal images of concealed object's surroundings, and thereby controlling IR signature of the concealed object that is covered by these panels (e.g. to blend in with the temperature of its surroundings or to create thermal image of an innocuous object).

Typically, these technologies require high energy consumption at the expense of fuel reserves of the concealed object (e.g. infantry fighting vehicle, military aircraft or ships, etc.). In addition, these technologies do not use a liquid-crystal technology for adaptive camouflage purposes. Therefore, there is a growing need to provide a new system, method and computer readable medium for controlling observed temperature of one or more panels.

References considered as background to the presently disclosed subject matter are listed below. Acknowledgement of the references herein is not to be inferred as meaning that these are in any way relevant to the patentability of the presently disclosed subject matter.

PhD proposition—APPLICATIONS OF LIQUID CRYSTALS TO OPTICAL CAMOUFLAGE TECHNIQUES IN THE THERMAL INFRARED RANGE—Camouflage techniques correspond to adaptation strategies to the surrounding environment. In conflict zones, these strategies allow a soldier or a vehicle to gain a decisive advantage over the enemy. In addition to the mimicry in the visible spectrum, we should also able to control the reflected infrared IR radiance (thermal signature), in order not to be detected by observing systems, such as infrared cameras. A solution for this issue is the use of elements with a controlled IR reflection, which allows to mitigate this signature. Liquid crystal materials have compatibilities with this function through its electrooptic properties. The objective of this PhD is to study the possibilities to control the reflectivity of a liquid crystal cell in the infrared spectrum. Three mechanisms using liquid crystal are identified.

Taken from: https://www.telecombretagne.eu/data/Optique%20%20PhD%20proposition.pdf at Nov. 11, 2018.

GB Patent No. GB2274154 published on Jan. 4, 1995 discloses a ships infra-red appearance is modified by determining the infra-red image of the ships surroundings and reflecting infrared radiation from its surroundings by reflector means pivotable about pivot points 9 to cause the ship to merge into its surroundings. Because the reflector means are pivotable the way in which the ships infra-red appearance is modified can be controlled and the infra-red appearance can be made to correspond to the ships background when viewed along the line of sight of a likely threat, thus making it difficult to detect by a heat-seeking missile. The reflector means may be coated with bands of material translucent to infra-red radiation but opaque to visible radiation, to make it inconspicuous, and may comprise an inflatable envelope with a reflective surface.

WO Patent application No. WO1996004520A1 published on Feb. 15, 1996 discloses an apparatus for altering the IR characteristics of a body (1) comprising a surface having at least two discrete areas (5a, 5b, 5c, 8, 9, 11a, 11b, 16) possessing different IR characteristics, masking means (3, 10, 15) for masking different portions of the surface, and controlling means for operating the masking means arranged such that operation of the controlling means alters the relative exposures of the two or more areas of the surface such as to impart desirable IR characteristics to an aspect of the body as detected from a remote point. In particular, an IR signalling apparatus comprising an inelastic surface (12) composed of alternating low IR emissivity elements (8) and high emissivity elements (9). The inner face of the surface (12) is bonded to a body (1) while the outer face is bonded to a polythene core (13) which is divided into individual nitrogen-filled chambers (14). Masking means (15) in the form of parallel inelastic strips (16) are bonded to the outer face of the core (13). These strips (16) have an inner side which is composed of low IR emissivity material (16a) and an outer side composed of medium to low IR emissivity material (16b) also coloured in the visible. The apparatus is mounted on a body (1) for signalling to a remote detector (6). The masking means (15) is located above the surface (12) so as to achieve a desired overall IR characteristic, and relative motion is introduced between the two at a known frequency. The detector (6) is filtered at this frequency.

U.S. Pat. No. 5,036,211 granted on Jul. 30, 1991 discloses means of reflecting and emitting electromagnetic energy in an appropriate wavelength band comprising an arrangement (10) of surfaces (11) which are reflective to energy in that wavelength band and energy emitters (12) having an emission of energy of such intensity that the combined reflection and emission of said surfaces match energy of a background in that wavelength band thereby camouflaging the surfaces. The said emitters (12) comprise strips of material which, upon energizing with an electric current, become heated and radiate energy. The means further comprises at least one radiometer (17) in association with a comparison means to provide an electrical signal which is a function of the difference between the combined reflection and emission and of the background, the electrical signal controlling the energization of the energy emitters (12).

GENERAL DESCRIPTION

In accordance with a first aspect of the presently disclosed subject matter, there is provided a Thermal Transparency Control Device (TTCD), comprising: an inner layer of Polymer Dispersed Liquid Crystal (PDLC) capable of changing an arrangement of liquid crystals comprised therein, in response to a change in a level of voltage supplied to the PDLC, so that the inner layer becomes more transparent as the voltage increases, thereby enabling more thermal radiation to pass through the inner layer; the inner layer placed between two outer layers of material wherein at least part of each of the two outer layers enables thermal radiation passage therethrough and wherein each of the two outer layers comprises an electrical interface that is in contact with the inner layer.

In some cases, the material can be one or more of: Germanium (Ge), Polyethylene terephthalate (PET), or High-Density Polyethylene (HDPE).

In some cases, the thermal radiation is a thermal infrared radiation.

In accordance with a second aspect of the presently disclosed subject matter, there is provided a system for controlling observed temperature of one or more panels, each of the panels comprising: a reflective material layer covering at least part of the panel and capable of reflecting thermal infrared radiation originating from the surroundings; and a TTCD in accordance with the presently disclosed subject matter, covering at least part of the reflective material layer and connected to a power supply capable of supplying voltage to the outer layers of the TTCD; the system comprising a controller configured to cause the power supply of one or more TTCD's of given panels of the panels to change the respective voltages, thereby changing an observed temperature of the given panels when the given panels are facing the surroundings by enabling more thermal radiation to reflect from the reflective material layer.

In some cases, the reflective material is one or more of: aluminum, or silver.

In some cases, the reflective material is coated with a visible light absorption coating.

In some cases, at least some of the given panels are facing the sky.

In some cases, the system further comprising one or more sensors configured to generate a heatmap of an area of interest, wherein the controller causes the power supply of the given panels to change the respective voltages to cause the panels to generate a heat signature imitating the heatmap, thereby concealing an object covered by the panels.

In some cases, the sensors include at least one optical sensor.

In some cases, the optical sensor is one or more of: an infrared sensor, a proximity sensor, an image sensor, motion detection sensor, or a camera.

In some cases, the heat signature is generated to imitate the heatmap as seen by an entity looking at the object from a certain geo-location.

In some cases, the object is one of the following: a person, a vehicle, an aerial vehicle, a nautical vehicle, a space vehicle, or a building.

In some cases, the system further comprising one or more auxiliary sensors, configured to sense an environment between the object and a potential viewing angle for viewing the object, wherein the controller is further configured to cause the power supply of the given panels to change the respective voltages also based on one or more readings obtained from the auxiliary sensors.

In some cases, the auxiliary sensors are one or more of: thermal infrared sensor, camera, dust sensor, radiation sensor, proximity sensor, elevation sensor, Global Positioning System (GPS) sensor, accelerometer sensor or moisture sensor.

In some cases, the controller causes the power supply of the given panels to change the respective voltages to cause the panels to generate a desired observed heat signature of a desired object, thereby changing a heat signature of an object covered by the panels to the desired observed heat signature.

In some cases, the heat signature is generated to imitate the desired heatmap as seen by an entity looking at the object from a certain geo-location.

In some cases, the object is one of the following: a person, a vehicle, an aerial vehicle, a nautical vehicle, a space vehicle, or a building.

In some cases, the system further comprising one or more auxiliary sensors, configured to sense an environment between the object and a potential viewing angle for viewing the object, wherein the controller is further configured to causes the power supply of the given panels to change the respective voltages also based on one or more readings obtained from the auxiliary sensors.

In some cases, the auxiliary sensors are one or more of: thermal infrared sensor, camera, dust sensor, radiation sensor, proximity sensor, elevation sensor, Global Positioning System (GPS) sensor, accelerometer sensor or moisture sensor.

In some cases, the panels are configured to conceal heat from one or more heat sources of an object to which the panels are connected.

In some cases, the thermal radiation is a thermal infrared radiation.

In accordance with a third aspect of the presently disclosed subject matter, there is provided a method for controlling observed temperature of one or more panels, each of the panels comprising: a reflective material layer covering at least part of the panel and capable of reflecting thermal infrared radiation originating from the surroundings; and a TTCD in accordance with the presently disclosed subject matter, covering at least part of the reflective material layer and connected to a power supply capable of supplying voltage to the outer layers of the TTCD; the method comprising causing, by a controller, the power supply of one or more TTCD's of given panels of the panels to change the respective voltages, thereby changing an observed temperature of the given panels when the given panels are facing the surroundings by enabling more thermal radiation to reflect from the reflective material layer.

In some cases, the reflective material is one or more of: aluminum, or silver.

In some cases, the reflective material is coated with a visible light absorption coating.

In some cases, at least some of the given panels are facing the sky.

In some cases, the method further comprising one or more sensors configured to generate a heatmap of an area of interest, wherein the controller causes the power supply of the given panels to change the respective voltages to cause the panels to generate a heat signature imitating the heatmap, thereby concealing an object covered by the panels.

In some cases, the sensors include at least one optical sensor.

In some cases, the optical sensor is one or more of: an infrared sensor, a proximity sensor, an image sensor, motion detection sensor, or a camera.

In some cases, the heat signature is generated to imitate the heatmap as seen by an entity looking at the object from a certain geo-location.

In some cases, the object is one of the following: a person, a vehicle, an aerial vehicle, a nautical vehicle, a space vehicle, or a building.

In some cases, the method further comprising one or more auxiliary sensors, configured to sense an environment between the object and a potential viewing angle for viewing the object, wherein the controller is further configured to cause the power supply of the given panels to change the respective voltages also based on one or more readings obtained from the auxiliary sensors.

In some cases, the auxiliary sensors are one or more of: thermal infrared sensor, camera, dust sensor, radiation sensor, proximity sensor, elevation sensor, Global Positioning System (GPS) sensor, accelerometer sensor or moisture sensor.

In some cases, the controller causes the power supply of the given panels to change the respective voltages to cause the panels to generate a desired observed heat signature of a desired object, thereby changing a heat signature of an object covered by the panels to the desired observed heat signature.

In some cases, the heat signature is generated to imitate the desired heatmap as seen by an entity looking at the object from a certain geo-location.

In some cases, the object is one of the following: a person, a vehicle, an aerial vehicle, a nautical vehicle, a space vehicle, or a building.

In some cases, the method further comprising one or more auxiliary sensors, configured to sense an environment between the object and a potential viewing angle for viewing the object, wherein the controller is further configured to causes the power supply of the given panels to change the respective voltages also based on one or more readings obtained from the auxiliary sensors.

In some cases, the auxiliary sensors are one or more of: thermal infrared sensor, camera, dust sensor, radiation sensor, proximity sensor, elevation sensor, Global Positioning System (GPS) sensor, accelerometer sensor or moisture sensor.

In some cases, the panels are configured to conceal heat from one or more heat sources of an object to which the panels are connected.

In some cases, the thermal radiation is a thermal infrared radiation.

In accordance with a fourth aspect of the presently disclosed subject matter, there is provided a non-transitory computer readable storage medium having computer readable program code embodied therewith, the computer readable program code, executable by a controller to perform a method for controlling observed temperature of one or more panels, each of the panels comprising: a reflective material layer covering at least part of the panel and capable of reflecting thermal infrared radiation originating from the surroundings; and a TTCD in accordance with the presently disclosed subject matter, covering at least part of the reflective material layer and connected to a power supply capable of supplying voltage to the outer layers of the TTCD; the method comprising causing, by a controller, the power supply of one or more TTCD's of given panels of the panels to change the respective voltages, thereby changing an observed temperature of the given panels when the given panels are facing the surroundings by enabling more thermal radiation to reflect from the reflective material layer.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
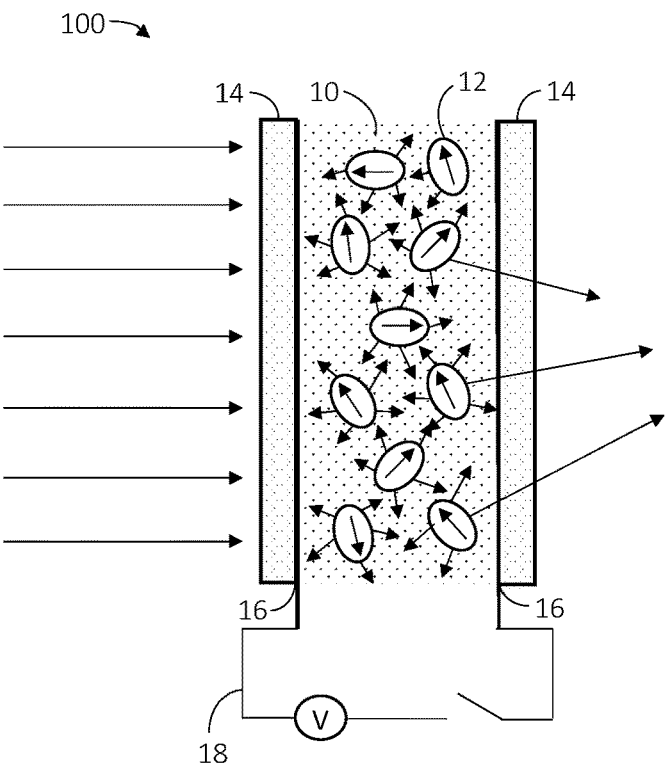
FIGS. 1A and 1B are block diagrams schematically illustrating one example of a Thermal Transparency Control Device (TTCD), in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "controlling", "covering", "supplying", "causing", "determining", "changing", "enabling", "generating", "concealing", "sensing" or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1B:
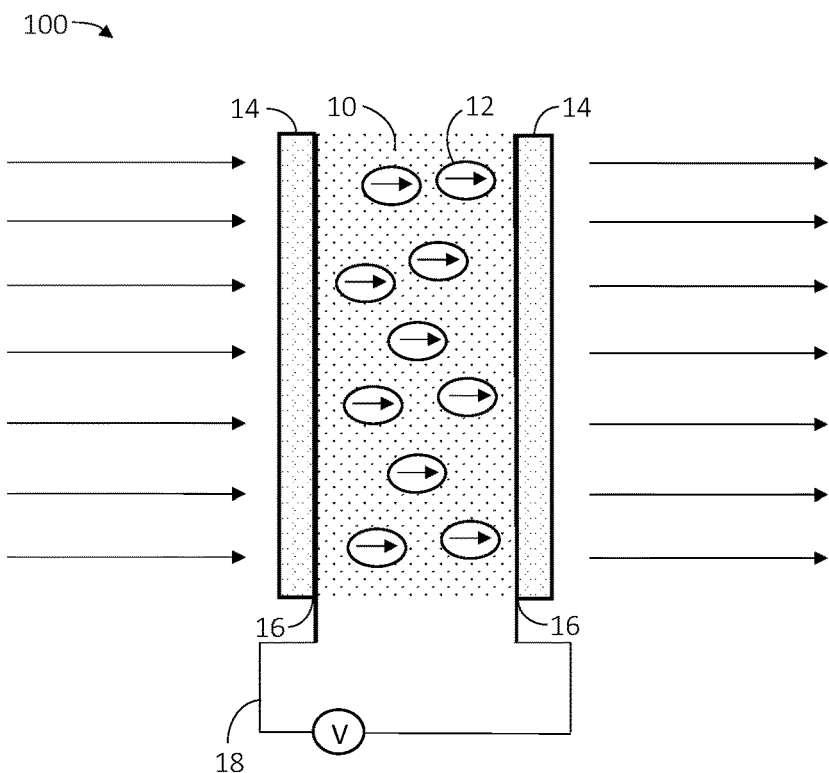

Before turning to FIGS. 1A and 1B, it is to be noted that although reference is made in the forgoing disclosure to a Thermal Transparency Control Device (TTCD) that can be configured to modulate passage of thermal radiation therethrough, it is by no means limiting and the teachings herein can be applied to thermal infrared radiation or infrared radiation, mutatis mutandis.

Bearing this in mind, attention is drawn to FIGS. 1A and 1B, showing block diagrams schematically illustrating one example of a Thermal Transparency Control Device (TTCD) 100, in accordance with the presently disclosed subject matter.

The Thermal Transparency Control Device (TTCD) 100 includes a polymer matrix 10, liquid crystal droplets 12, outer layers of material 14, an electrical interface 16 and a power supply 18.

The Thermal Transparency Control Device (TTCD) 100 can be configured to modulate passage of thermal radiation therethrough. For this purpose, the polymer matrix 10 and the liquid crystal droplets 12 dispersed therein form an inner layer of a Polymer Dispersed Liquid Crystal (PDLC). The inner layer is placed between two outer layers of material 14, wherein each of the two outer layers comprises electrical interface 16 that is in contact with the inner layer and connected to the power supply 18.

The PDLC has an electro-optic performance that enables reversable shuttering of thermal radiation therethrough (i.e. thermal translucency modulation) as a response to voltage applied by the electrical interface 16.

The outer layers of material 14 can be made of Germanium (Ge), Polyethylene terephthalate (PET), High-Density Polyethylene (HDPE) or combination thereof, or any other material (e.g. isotropic solid) that is suitable for serving as a substrate for the PDLC. That is, a thermal radiation transmitting material or at least partially thermal radiation transmitting material.

Electrical interface 16 can be any electrical conductor configured to allow a flow of an electrical current therethrough so that a desired voltage will be applied on the inner layer. In some cases, the electrical interface 16 can be an electrode, such as but not limited to, cathode and anode, a bipolar electrode, an auxiliary electrode, alternating current electrodes, etc. The Electrical interface 16 can be made of Polyethylene, Germanium (Ge), Silicon (Si), Indium tin oxide (ITO), Graphene, Carbon nanotube (CNT), Poly(3,4-ethylenedioxythiophene) (PEDOT) or any other material that is transparent to thermal radiation (i.e. thermal radiation transmitting material).

The inner layer of Polymer Dispersed Liquid Crystal (PDLC) is capable of changing an arrangement of liquid crystal droplets 12 comprised therein, in response to a change in a level of voltage supplied to the PDLC, so that the inner layer becomes more transparent as the voltage increases, thereby enabling more thermal radiation to pass through the inner layer. That is, the PDLC can switch between a thermal radiation transparent state (FIG. 1B) and a thermal radiation scattering state (FIG. 1A) by the electric field applied thereon or the thermal translucency can be modulated therebetween (i.e. between the transparent state and the scattering state). The thermal transmittance is a function of the voltage applied by the electrical interface 16 on the inner layer as the degree of thermal transparency can be controlled by adjusting the applied voltage. At low voltages only part of the liquid crystal droplets 12 completely align with the electric field created between the electrical interface 16, so only a small portion of the thermal radiation passes through the TTCD whilst most of the thermal radiation is scattered. As the voltage is increased, fewer liquid crystal droplets 12 remain out of alignment with the electric field, resulting in less thermal radiation being scattered by the PDLC. For example, at 65 VAC full alignment of the liquid crystal droplets 12 with the electric field can be achieved.

In some cases, this can be achieved by electrical modulation of refractive index of the liquid crystal droplets 12 to match or mismatch the refractive index of the outer layers of material 14.

According to another example of the presently disclosed subject matter, the inner layer of the Thermal Transparency Control Device (TTCD) 100 may include a Liquid Crystal (LC) instead of Polymer Dispersed Liquid Crystal (PDLC).

In some cases, a spacer layer can be placed between the inner layer and the electrical interface 16 giving rise to homogenous spreading and accurate thickness of the inner layer.

FIG. 1A depicts a natural state of the Thermal Transparency Control Device (TTCD) 100 wherein the inner layer appears opaque to thermal radiation due to random orientations of the liquid crystal droplets 12 in the polymer matrix 10, thus scattering the radiation as it permeates the inner layer of the TTCD. In this state no voltage is applied to the inner layer by the power supply 18.

FIG. 1B depicts a thermal radiation transparent state of the Thermal Transparency Control Device (TTCD) 100 with the application of an electric field. In this state voltage is applied by the power supply 18 to the electrical interface 16 thereby creating an electric field therebetween (i.e. between the electrodes), which causes an electro-optic reorientation of the liquid crystal droplets 12 within the polymer matrix 10. This reduces the degree of optical scattering through the inner layer, giving rise to thermal radiation transparent state. Attention is now drawn to FIGS. 2A and 2B, showing block diagrams schematically illustrating one example of a system for controlling observed temperature of one or more panels 200, in accordance with the presently disclosed subject matter.

The system for controlling observed temperature of one or more panels 200 (also referred to herein as "system") includes a panel 20, a reflective material layer 22, a Thermal Transparency Control Device (TTCD) 100, a power supply 18 and a controller 28.

Figure 2A:
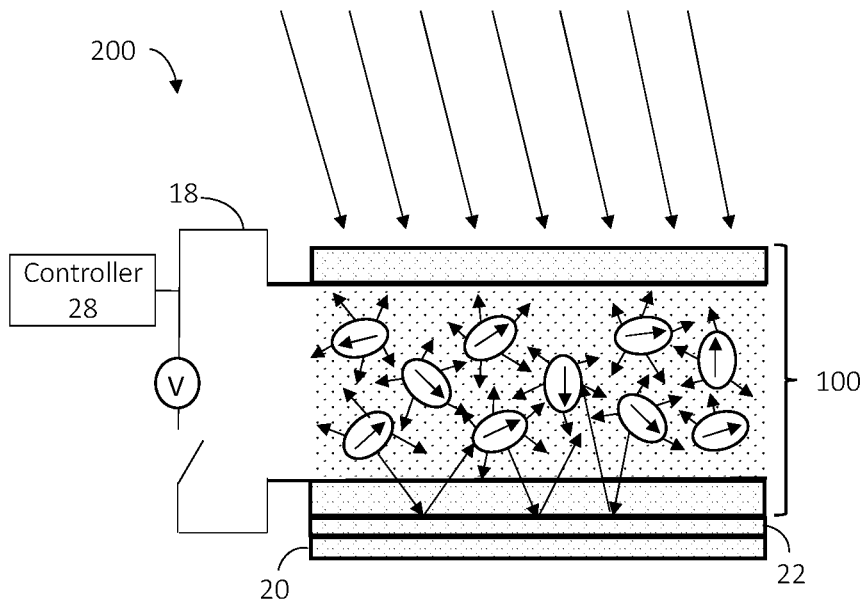
FIGS. 2A and 2B are block diagrams illustrating one example of a system for controlling observed temperature of one or more panels, in accordance with the presently disclosed subject matter.
Figure 2B:
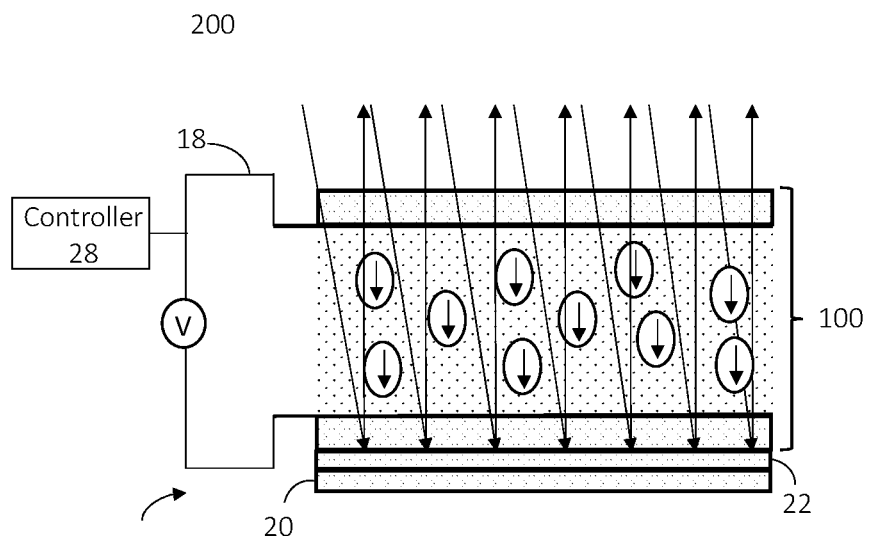

It is to be noted that FIGS. 2A and 2B illustrate single panel configuration for readily understanding the true spirit of the presently disclosed subject matter, nevertheless system 200 may include more than one panel (e.g. dozens, hundreds, thousands of panels or even more). For example, system 200 may include a number of panels required to conceal a person, a vehicle, an aerial vehicle, a nautical vehicle, a space vehicle, a building, etc. It is to be noted that the panels can be of different shapes and sizes.

According to the presently disclosed subject matter, the reflective material layer 22 of system 200 can cover at least part of the panel 20 and is capable of reflecting thermal radiation originating from the surroundings.

The reflective material layer 22 can be any material that possesses optical reflectance characteristics over the thermal radiation spectrum (e.g. silver and aluminum can be used in view of their reflectance of about 98% and 93%, respectively, at normal incidents).

According to the presently disclosed subject matter, the reflective material layer 22 can be coated with a visible light absorption coating (e.g. various types of black coatings which exhibit strong absorption capacity in the visible light spectrum and optionally associated with strong thermal emission, i.e. a high emissivity).

As depicted in FIGS. 2A and 2B, the Thermal Transparency Control Device (TTCD) 100 can cover at least part of the reflective material layer 22 and, as described hereinabove with respect FIGS. 1A and 1B, is connected to a power supply 18 capable of supplying voltage to the outer layers 14 of the TTCD 100.

System 200 includes at least one controller 28. The controller 28 can be one or more processing units (e.g. central processing units), microprocessors, microcontrollers or any other computing devices or modules, including multiple and/or parallel and/or distributed processing units, which are adapted to independently or cooperatively process data for controlling relevant resources of the system 200 for controlling observed temperature of one or more panels 20 and for enabling operations related to resources thereof. The controller 28 can be configured to cause the power supply 18 of one or more TTCD's 100 of given panels 20 of the panels to change the respective voltages, thereby changing an observed temperature of the given panels 20 when the given panels 20 are facing the surroundings by enabling more thermal radiation to reflect from the reflective material layer.

FIG. 2A depicts an inactive state of system 200, a thermal radiation scattering state, wherein no voltage is applied to the outer layers 14 of the TTCD 100 by the power supply 18. In this state, each panel 20 of one or more panels of system 200 reflects the incident thermal radiation scattered by the TTCD 100.

FIG. 2B depicts an active state of system 200, a thermal radiation transmitting state, wherein voltage is applied to the outer layers 14 of the TTCD 100 by the power supply 18. In this state, each panel 20 of one or more panels of system 200 reflects the incident thermal radiation transmitted by the TTCD 100. As described hereinabove with reference to FIGS. 1A and 1B, thermal translucency (i.e. transmittance) can be modulated by changing the voltage applied to the outer layers 14 of the TTCD 100 by the power supply 18. This way, the multilayered assembly of system 200 can generate a heat/thermal signature of its surroundings or resemble a heat/thermal signature of an innocuous object. Such thermal/infrared stealth technology enables to conceal a desired object by reducing its thermal/infrared signature and thereby reducing its susceptibility to thermal/infrared guided weapons and thermal/infrared surveillance sensors.

It is to be noted that FIGS. 2A and 2B depict two contrary states (i.e. edge states) of system 200, a thermal radiation scattering state (FIG. 2A) and a thermal radiation transparent state (FIG. 2B), while intermediate states (i.e. thermal transparency modulated states) can also be generated by the system 200, although not shown in the appended drawings. That is, thermal radiation transparency of the intermediate states generated by system 200 may vary between thermal radiation scattering state (FIG. 2A) and thermal radiation transparent state (FIG. 2B), giving rise to various levels of thermal transparency modulated between said edge states.

Referring back to the active state of system 200, in some cases, at least some of the given panels are facing the sky. For example, some of the panels can be tilted to an angle (e.g. an angle of more than 5-10 degrees with respect to deployment surface of the panels) wherein these panels are facing the sky. This way, said panels can be cooled (i.e. seen for example as cool areas on thermograms) because the temperature of the sky is generally much lower than the temperature of the object these panels conceal (e.g. engines).

In other cases, external cooling and/or heating sources can be utilized in order to cool and/or heat the panels. This way system 200 can generate a thermal image of the external source that is being utilized.

System 200 may further include one or more sensors configured to generate a heatmap of an area of interest. For this purpose, the controller 28 can be configured to cause the power supply 18 of the given panels to change the respective voltages to cause the panels to generate a heat signature imitating the heatmap, thereby concealing an object (e.g. a person, a vehicle, an aerial vehicle, a nautical vehicle, a space vehicle, a building, etc.) covered by the panels. Said sensors may include at least one optical sensor, such as but not limited to, an infrared sensor, a proximity sensor, an image sensor, motion detection sensor, or a camera.

The heatmap of an area of interest may be for example a heatmap of the concealed object's surroundings (e.g. its background). In such case, the given panels can be configured to change the respective voltages to cause said panels to generate a heat signature of the concealed object's surroundings (e.g. its background).

In some cases, the heat signature can be generated to imitate the heatmap as seen by an entity looking at the object from a certain geo-location (e.g. an enemy scanning its surroundings with a thermographic camera to detect heat emitted by a suspicious person or equipment). In these cases, the certain geo-location can be determined or calculated by system 200 and represented by corresponding parameters (e.g. a potential angle of view of the object, as seen by an entity looking at the object, that can be constant or gradually changing).

System 200 may further include one or more auxiliary sensors, configured to sense an environment between the object and a potential viewing angle for viewing the object. The controller 28 can be further configured to cause the power supply 18 of the given panels to change the respective voltages also based on one or more readings obtained from the auxiliary sensors.

The auxiliary sensors may be one or more of: infrared sensor, camera, dust sensor, radiation sensor, proximity sensor, elevation sensor, Global Positioning System (GPS) sensor, accelerometer sensor or moisture sensor.

The infrared sensor may be a passive infrared sensor (PIR sensor) and/or an active infrared sensor and can be utilized by system 200 to measure infrared (IR) light radiating from objects in its field of view (e.g. the environment between the object and a potential viewing angle for viewing the object or the surroundings of the object, for example its background).

In some cases, system 200 can utilize a camera in order to generate a desired thermal signature or sense the environment between the object and a potential viewing angle for viewing the object such as, but not limited to, a forward-looking infrared (FLIR) camera, a thermal imaging camera, a night-vision device (NVD) (e.g. NVG camera), a daylight camera, etc.

System 200 can use the readings from one or more of said sensors to adjust the observed temperature accordingly to compensate for phenomena that occur between the object and the viewer (e.g. cloud cover, haze, high or low dust density, relative movement between the object and a potential viewing angle for viewing the object, target tracking utilizing GPS sensor to track potential hostile targets in object's surroundings, etc.).

According to the presently disclosed subject matter, the controller 28 can be further configured to cause the power supply 18 of the given panels to change the respective voltages to cause the panels to generate a desired observed heat signature of a desired object, thereby changing a heat signature of an object covered by the panels to the desired observed heat signature. For example, system 200 can generate heat signature of an innocuous object (e.g. civil vehicle) thereby concealing the object covered by the panels (e.g. military tank). In some cases, this can also be achieved by utilizing one or more auxiliary sensors (i.e. generating the desired observed heat signature utilizing at least one auxiliary sensor).

In some cases, system 200 can be further configured to generate a heat signature that can imitate a desired heatmap as seen by an entity looking at the object from a certain geo-location (e.g. an enemy scanning its surroundings with a thermographic camera to detect heat emitted by a suspicious person or equipment). For example, system 200 can generate a heat signature of an innocuous object (e.g. fishing ship) to conceal the object covered by the panels (e.g. warship) that can be seen by an entity looking at the object from a certain geo-location (e.g. military watchtower).

It is to be noted that the object can be one or more of the followings: a person, a vehicle, an aerial vehicle, a nautical vehicle, a space vehicle, a building, etc.

It is to be further noted that the panels can be configured to conceal heat from one or more heat sources of an object to which the panels are connected (e.g. military freight truck loaded with soldiers all having detectable thermal/infrared radiation).

System 200 may further include a memory. The memory may include a machine-accessible storage medium (or more specifically a computer-readable storage medium) on which stored one or more sets of instructions (e.g. software) embodying any one or more of the methodologies or functions described herein. The software may also reside, completely or at least partially, within the memory and/or within the controller 28 during execution thereof by the system 200, the memory and the controller 28 also constituting machine-readable storage media. The software may further be transmitted or received over a network via the network interface device.

It is to be further noted that the term "machine-readable storage medium" should be taken to include a single medium or multiple media (e.g. centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present presently disclosed subject matter. the term "machine-readable storage medium" shall accordingly be taken to include, but not limited to, solid-state memories, and optical and magnetic media.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

Examples of the presently disclosed subject matter may be provided as a computer program product, or software, that may include a machine-readable medium having stored thereon instructions, which may be used to program a computer system (or other electronic devices) to perform a process according to the presently disclosed subject matter. A machine-readable medium includes any mechanism for storing or transmitting information in a form readable by a machine (e.g. a computer). For example, a machine-readable (e.g. computer readable) medium includes a machine (e.g. a computer) readable storage medium (e.g. read only memory ("ROM"), random access memory ("RAM"), magnetic disk storage media, optical storage media, flash memory devices, etc.), a machine (e.g. computer) readable transmission medium (electrical, optical, acoustical or other form of propagated signals (e.g., infrared signals, digital signals, etc.)), etc.

FIGS. 2A and 2B illustrate a diagrammatic representation of a system in the exemplary form of a machine including hardware and software such as e.g. set of instructions, causing the system to perform any one or more of the above techniques. In alternative examples, the machine may be connected (e.g. networked) to other machines in a Local Area Network (LAN), an intranet, an extranet, or the Internet. Further, while only a single machine is illustrated, the term "machine" shall also be taken to include any collection of machines (e.g. computers) that individually or jointly execute a set (or multiple sets) of instructions to perform any one or more of the methodologies discussed herein.

In the foregoing specification, the presently disclosed subject matter has been described with reference to specific examples of embodiments of the presently disclosed subject matter. It will, however, be evident that various modifications and changes may be made therein without departing from the broader spirit and scope of the presently disclosed subject matter as set forth in the appended claims.

Also, the presently disclosed subject matter is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

While certain features of the presently disclosed subject matter have been illustrated and described herein, many modifications, substitutions, changes, and equivalents will now occur to those of ordinary skill in the art. It is, therefore, to be understood that the appended claims are intended to cover all such modifications and changes as fall within the true spirit of the presently disclosed subject matter.

The invention claimed is:

1. A system for controlling observable radiation of one or more objects, the system comprising at least:
   (i) one or more panels, each panel comprising at least:
   a thermal transparency control device (TTCD) configured to controllably change its transparency at least within the infrared (IR) electromagnetic spectral range, in response to applying of electricity thereto, wherein the TTCD comprises two outer layers serving as two electrical interfaces and an inner layer placed between the two outer layers, the inner layer comprising a Polymer Dispersed Liquid Crystal (PDLC) configured to change an arrangement of droplets of the PDLC, in response to a change in a level of voltage supplied to the TTCD, thereby control radiation transparency including thermal radiation emissivity of the TTCD; and
   at least one additional layer, configured to further control heat signature as irradiated from the respective panel when observed from an external point of view in respect to the one or more objects; and
   (ii) a controller configured at least to control power supply to the TTCD, wherein the control over the observable thermal radiation is done by using the combined TTCD and the at least one additional layer for camouflaging thermal signature of the one or more objects.

2. The system of claim 1, wherein the thermal radiation is within the infrared (IR) electromagnetic spectral range in one or more of: near-IR (NIR), middle-IR (MIR), and/or far-IR (FIR) electromagnetic spectral range, and/or
   wherein the at least one additional layer comprises at least one of:
   a reflective layer comprising a reflective material that has high reflectivity in the visible electromagnetic spectral range and in the NIR, MIR and/or FIR electromagnetic spectral range;
   an emissive layer, comprising a coating that absorbs light in the visible spectral range and has high thermal emissivity in the NIR, MIR and/or FIR electromagnetic spectral range.

3. The system of claim 2, wherein the reflective material of the reflective layer comprises aluminum and/or silver.

4. The system of claim 1, wherein the droplets of the PDLC comprise liquid crystal droplets and/or Silicon droplets.

5. The system of claim 1 further comprising at least one auxiliary sensor, positioned and configured to generate a heatmap of an area of interest, wherein the controller controls power supply to at least one of the one or more panels such as to cause the at least one of the one or more panels to generate a camouflage heat signature imitating the heatmap of the area of interest, thereby concealing the heat signature of the one or more objects.

6. The system of claim 5, wherein the auxiliary sensors are one or more of: an optical sensor, an infrared sensor, a camera, a dust sensor, a radiation sensor, a proximity sensor, an elevation sensor, a Global Positioning System (GPS) sensor, an accelerometer sensor, a thermometer, a moisture sensor.

7. The system of claim 1, wherein the one or more panels are positioned such as to cover or screen the one or more objects, to form a controllable thermal and/or visibility camouflage to the one or more objects.

8. The system of claim 1, wherein the controller causes the power supply of each given panel to change the respective voltage supplied thereto, to cause the respective panel to generate a desired observed heat signature that does not reflect the real heat signature of the one or more objects being covered by the one or more panels, for thermal and/or visual camouflaging of the one or more objects being covered or screened by the one or more panels of the system.

9. The system of claim 8, wherein the heat signature is generated to imitate a desired heatmap as seen by an entity looking towards the one or more objects from a certain observation perspective.

10. The system of claim 1, wherein the observed thermal radiation is a thermal infrared radiation.

11. The system of claim 1, wherein each of the two outer layers of the PDLC is transparent at least to thermal radiation.

12. The system of claim 11, wherein each of the two outer layers comprises one or more of: polyethylene terephthalate (PET), High-Density Polyethylene (HDPE), isotropic solid, and/or
   wherein the electrical interface of each outer layer may include one of: Polyethylene; Germanium (Ge); Silicon (Si); Indium tin oxide (ITO); Graphene, Carbon nanotube (CNT), Poly ethylenedioxythiophene (PEDOT).

13. A method for controlling observed thermal radiation, when observable from an external point of view in respect to one or more objects comprising at least:
   providing the system of claim 1;
   controlling at least thermal transparency of the TTCD of the system by controlling power supplied to its PDLC vias the two outer layers of the TTCD; and
   controlling overall thermal radiation from the at least one panel of the system to camouflage the heat signature of the one or more objects by using the at least one additional layer,
   wherein the control over the observable thermal radiation is done by using the combined TTCD and the at least one additional layer for camouflaging thermal signature of the one or more objects.

14. The method of claim 13, wherein the at least one additional layer comprises at least one of:
a reflective layer comprising a reflective material that has high heat, IR and/or visible light reflectivity;
an emissive layer, comprising a coating that absorbs light within the visible spectral range and has high thermal emissivity.

15. The method of claim 14, wherein the reflective material is one or more of: aluminum, or silver.

16. The method of claim 13 further comprising using one or more sensors positioned and configured to sense thermal properties of an area of interest, wherein the controller o the system is configured to control voltage supplied to each panel, for generating an imitation heat signature, imitating thermal properties of the area of interest for camouflaging the one or more objects.

17. The method of claim 16, wherein the imitation heat signature is generated to imitate the heatmap as seen by an entity looking at the object from a certain geo-location.

18. The method of claim 16, wherein at least one of the one or more objects is one of the following: a person, a vehicle, an aerial vehicle, a nautical vehicle, a space vehicle, or a building, a heat source, an engine.

19. The method of claim 16, further comprising one or more auxiliary sensors, configured to sense an environment between the object and a potential viewing angle for viewing the one or more objects, wherein the controller is further configured to cause the power supply of the given panels to change the respective voltages also based on one or more readings obtained from the auxiliary sensors.

20. A non-transitory computer readable storage medium having computer readable program code embodied therewith, the computer readable program code, executable by a controller to perform a method for controlling observed thermal radiation, when observable from an external point of view in respect to one or more objects through one or more panels, wherein each of the one or more panels comprises at least: a thermal transparency control device (TTCD) controlling change of its transparency at least within the infrared (IR) electromagnetic spectral range, in response to applying of electricitythereto, wherein the TTCD comprises two outer layers serving as two electrical interfaces and an inner layer placed between the two outer layers, the inner layer comprising a Polymer Dispersed Liquid Crystal (PDLC) changing an arrangement of droplets of the PDLC, in response to a change in a level of voltage supplied to the TTCD, thereby controlling radiation transparency including thermal radiation emissivity of the TTCD; and at least one additional layer, configured to further control heat signature as irradiated from the respective panel when observed from an external point of view in respect to the one or more objects, wherein the control over the observable thermal radiation is done by using the combined TTCD and the at least one additional layer for camouflaging thermal signature of the one or more objects.

* * * * *